3,282,400
PENDULUM UNLOADER

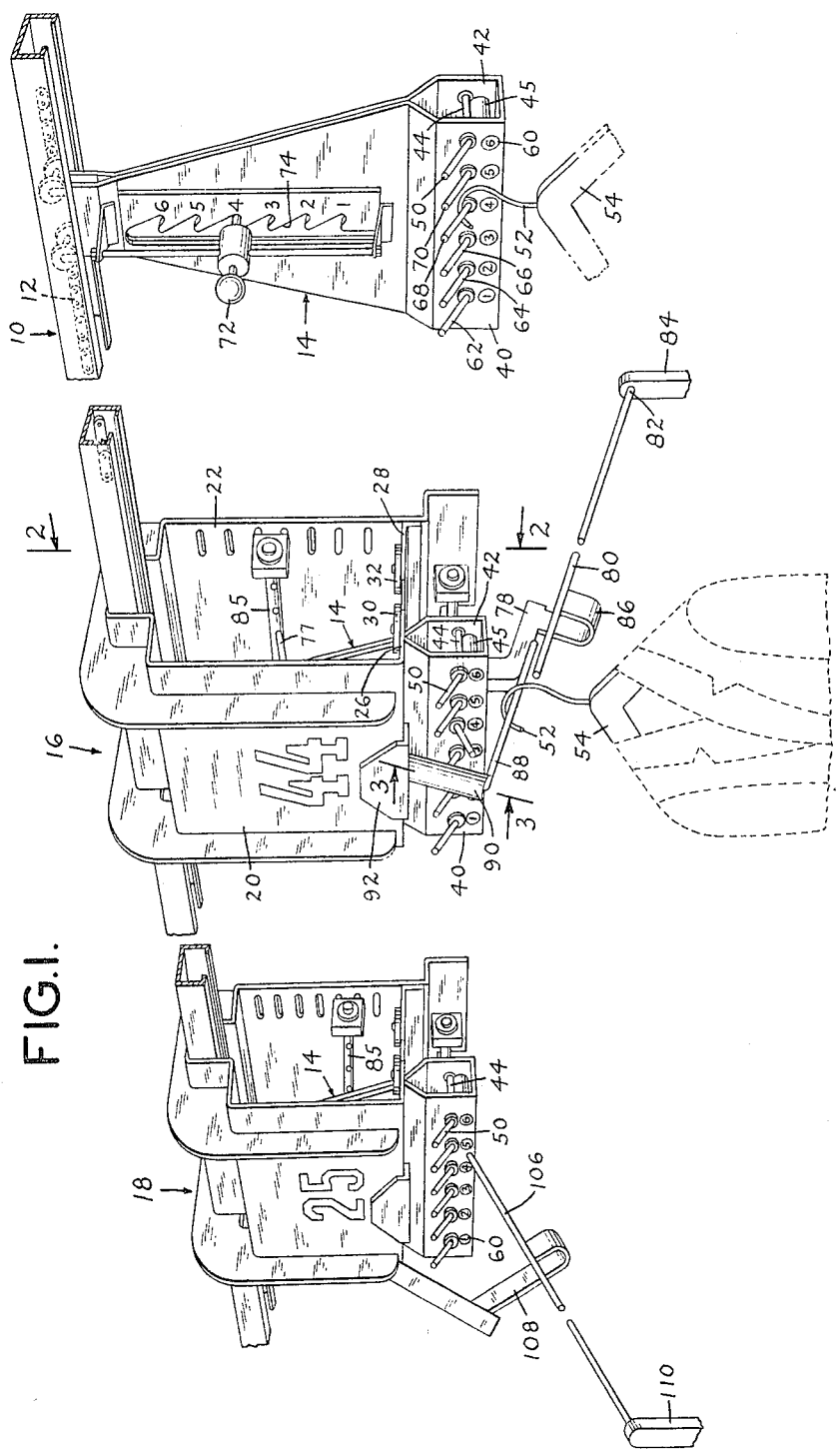

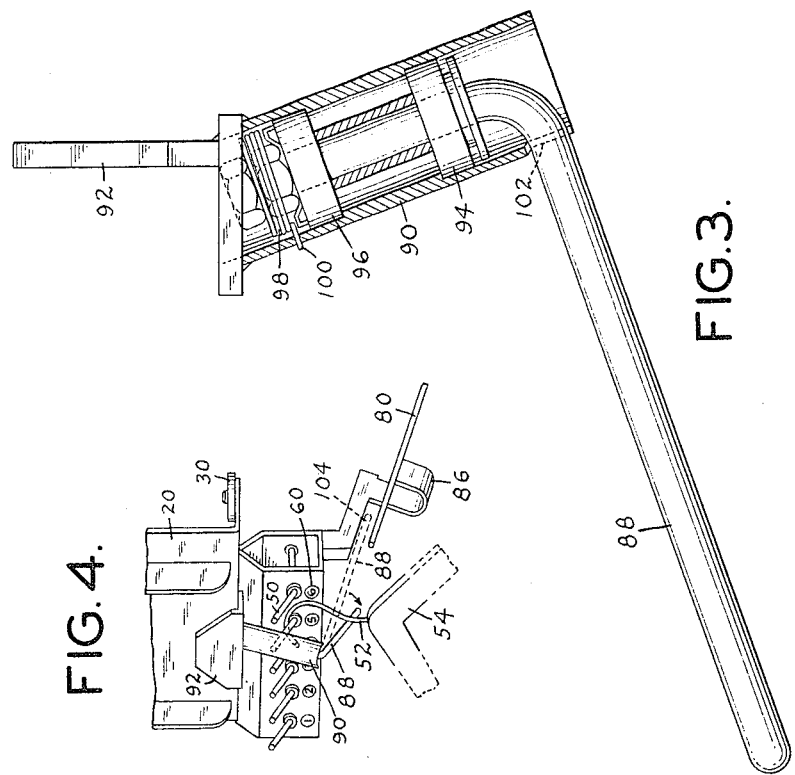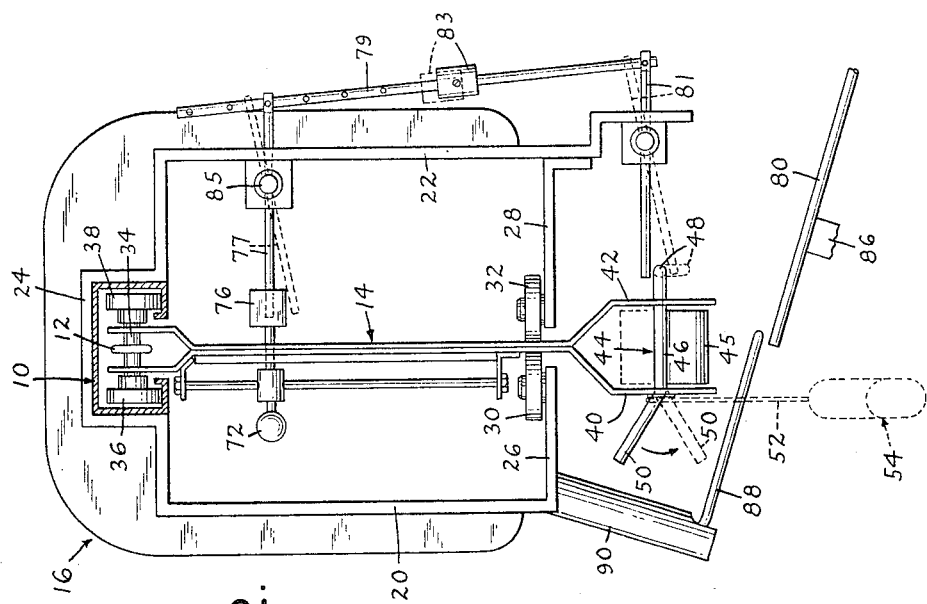

Henry C. Jönson, Kungsbacka, Sweden, assignor to Aktiebolaget Valida Maskiner, Kungsbacka, Sweden, a corporation of Sweden
Filed Feb. 5, 1965, Ser. No. 430,676
5 Claims. (Cl. 198—38)

The present invention relates to conveyors and more particularly to conveyors of the overhead type having unloading stations through which articles carried by the transporter units of the conveyor are successively moved and selectively unloaded. The present invention is of particular utility in connection with conveyors of the type disclosed, for example, in U.S. Patent 2,897,951 granted August 4, 1959, to H. C. Jonson in which the transporter units, because of their particular construction, cause the unloading movement of a transported article to be initiated in one only of the two directions lateral of the path of movement of the transporting units.

The present invention provides simple take-away devices of two different constructions which may be associated with the unloading stations located along the path of the conveyor whereby the unloaded articles may be guided to one side or the other of the conveyor path as may be desired. By providing stations of both types available for installation in a conveyor system it frequently becomes possible to make much more efficient use of floor space and of a given length of conveyor.

An object of the present invention is to provide a conveyor which is of simple inexpensive construction providing for the unloading of articles in the unloading stations and the movement thereof from said unloading stations in either of the two directions which are lateral to the path of the conveyor.

The present invention will be described in a specific embodiment which is adapted for incorporation in a conveyor of the type disclosed in said U.S. Patent 2,897,951 although the adaptability of the invention to conveyors of other types will be evident upon consideration of the following detailed description of such embodiment taken in connection with the drawings accompanying and forming a part of this specification. In the drawings:

FIG. 1 is a fragmentary perspective view of a conveyor system showing two unloading stations having associated devices for conducting the unloaded articles respectively to opposite sides of the conveyor path;

FIG. 2 is a vertical sectional view along the line 2—2 in FIG. 1;

FIG. 3 is a vertical sectional view along the line 3—3 in FIG. 1; and

FIG. 4 is a perspective view of a portion of FIG. 1.

Referring now to the drawings, in FIG. 1 there is shown a portion of an overhead conveying system comprising an overhead track 10 which is supported by suitable means (not shown) such as pedestals or ceiling hangers, and which encloses a chain 12 attached at suitable intervals to transporter units 14. Spaced along the track 10 at suitable intervals there are unloading stations generally indicated at 16 and 18. Normally the track 10 will be arranged in an endless path so as to contain an endless chain 12 which may be driven by suitable means (not shown) whereby each of the transporter units 14 eventually will be carried through the entire length of said endless path as is customary in the conveyor art.

From a consideration of FIG. 2 it will be observed that the unloading station 16 comprises generally vertical front and rear walls 20 and 22 respectively which join at the top in a suitable conformation 24 to fit snugly over the outside of the track 10 whereby the station may be located in any desired position lengthwise of said track 10. The unloading station 16 also includes inwardly-extending generally horizontal walls 26 and 28 the inner ends of which are so spaced from one another as to permit the passage therebetween of the series of article transporters 14. Preferably also freely rotatable guide rollers 30 and 32 are mounted on the walls 26 and 28 and extend substantially into contact with the transporters 14 as they move through the station to prevent lateral or swinging movement thereof.

Also, as seen in FIG. 2, each transporter unit 14 may be of simple sheet metal construction carrying at its top an axle 34 to the central portion of which may be attached the chain 12 and on the outer ends of which are carried suitable track-riding rollers 36 and 38. At the lower end of the transporter 14 the sheet metal walls from which it is made diverge to form a housing having front and rear walls 40 and 42 respectively. An article carrying finger indicated generally at 44 includes a horizontally disposed portion 46 which extends through the front and rear walls 40 and 42 and is arranged to freely rotate within said walls. At is rear end the finger 44 is provided with an actuating arm 48 which extends laterally of the axis of the finger 44 and which cooperates with mechanism within the stations for rotation of the finger 44 when so desired. At its other end the finger 44 is provided with an inclined extension 50 which, in the full line position illustrated in FIG. 2, serves as a hook which will retain an article hung thereon, as for example the conventional wire hook 52 of a garment hanger indicated generally at 54. Rotation of the finger 44 about the horizontal axis thereof into the position illustrated in dot-and-dash lines in FIG. 2 will cause the inclined portion 50 thereof to be directed downwardly whereupon the garment hanger 54 will gravitate off the end of the finger. A counter weight 45 yieldably urges the finger 44 to return to the full line position.

Referring now to FIG. 1 it will be observed that each of the transporter units 14 is provided with a plurality of rotatable fingers identical with the finger 44 described in the preceding paragraph. The upwardly inclined portion 50 of the finger 44 is shown at the right hand end of each transporter unit 14 and the remaining fingers are arranged in the same horizontal plane as the finger 44. For purposes of illustration there are shown six fingers on each transporter unit 14 each have a numbering tab or label associated therewith. For example, the portion 50 of the finger 44 is positioned above a numbering label 60 which bears the numeral 6 and the remaining fingers 62, 64, 66, 68 and 70 are associated respectively with numbering labels bearing the numerals 1, 2, 3, 4 and 5. Each transporter unit 14 also includes a knob 72 movable on a guide bar and having a portion which extends through a slot 74 in the transporter 14. At its opposite end (see FIG. 2) the knob carries a cam 76. The knob and cam unit 72, 76 may be positioned in any one of six appropriately numbered notches formed along a vertical edge of the slot 74 whereby the cam 76 may be placed at any one of six different levels so as to engage the finger-turning mechanism only in an unloading station wherein such mechanism is at the selected level.

The transporter 14 illustrated at the right hand end of FIG. 1 has the knob and cam unit 72, 76 in the notch numbered 4 so that when the transporter passes through any unloading station in which the actuating mechanism is at the fourth level a selected one of the fingers 44, 62, 64, 66, 68 or 70 will be rotated.

Referring to FIG. 2 one form of linkage for rotating the selected finger is shown. Thus a lever 77 is positioned to be struck by the cam 76 and swung downwardly thereby into the broken-line position. A link 79 is provided with a series of holes for connection at different levels with the lever 77. A lever 81, pivoted at a level coinciding with the level of the rotatable fingers on the transporter 14, is connected with the lower end of link 79. When the lever 81 is moved downwardly into the broken-line position it will strike one of the arms 48 on a finger and as the transporter continues to move the arm 48 will be rotated through about 180° whereby the inclined portion 50 of the finger 44 for example will be turned to unloading position. The lever 81 is positioned permanently at the point at which unloading is desired. The lever 77, on the other hand is pivoted on a shaft 85 which may be secured to the back wall 22 of the station 16 at any one of six levels for cooperation with the cam 76 and connection with the link 79. Also, the cam-engaging portion of the lever 77 may be positioned lengthwise of the shaft 85 in any one of six different positions so as to be effective on a selected one of the six rotatable fingers carried by each transporter 14. A weight 83 on the link 81 serves to return the linkage to full line position after the cam 76 has passed by.

For convenience in use all of the unloading stations may have prominent numbers thereon indicating what will be unloaded therein. For example the station 16 bears the number 44 which indicates that the lever 77 therein is at the fourth level and that it will rotate the finger numbered 4 for unloading. A dispatcher wishing to send an article to this station for unloading will place the knob and cam 72, 76 on any one of the transporters 14 at the fourth level (notch number 4) and will hang the article on the finger numbered 4. In all stations with the lever 77 at the fourth level some finger other than the one numbered 4 will be rotated except at the station numbered 44. In all other stations wherein the finger numbered 4 is intended to be rotated the lever 77 will be at some level other than the fourth. These stations will be numbered 34 or 64, for example, and it will be apparent that the article hung on finger number 4 on this particular transporter will pass through as many of said stations as may lie between the dispatcher and station member 44 without unloading. The construction so far described is substantially the same as that disclosed in said U.S. Patent 2,897,951 and reference may be had to said patent for further details.

According to the present invention the take-away mechanism for receiving the unloaded article is so designed as to conduct the unloaded article beneath and behind the unloading station in a station such as 16 or forward of a station such as 18. To this end station 16 has secured thereto a bracket 78 which rigidly supports a downwardly and rearwardly inclined rod 80 of suitable and appropriate length, the outer end of which is secured at 82 to a pedestal or other fixture 84. The bracket 78 is provided with a reversely curved portion 86 which permits of the passage of the free end of a clothes hanger hook 52 which may slide down the rod 80 under the influence of gravity.

Such unloading in station 16 is provided for by a switch mechanism including a rod 88 pivoted axially of a housing 90 which in turn is secured by means of a bracket 92 to the stationary portion of the unloading station 16. The rod 88 is inclined downwardly and is yieldably urged into the full line position shown in FIG. 1 wherein it extends across and beneath the path of the transporters 14 with the free end thereof overlapping the end of the fixed rod 80. As shown in FIG. 3 the rod 88 is pivoted in bearings 94 and 96 within the housing 90 and it is urged to rotate into the position just described by means of a coil spring 98 having a tail 100 bearing against the housing 90. Also it will be observed in FIG. 3 that the rod 88 is arranged to strike against an abutment 102 formed in the housing 90 thus establishing the limit position into which it is urged by the spring 98.

Referring now to FIG. 4 the rod 88 is shown swinging from the position just described toward a position indicated in full lines in which the free end no longer overlaps the rod 90. Thus, whenever an article carrying device, such as a coat hanger, is positioned upon any one of the six article carrying fingers of a transporter 14 which is not the finger which will be rotated into unloading position within the particular unloading station 16, the wire hook 52 of such article carrier will engage the rod 88 and continued movement of the transporter 14 will cause the rod 88 to swing yieldably through the full line position of FIG. 4 and into such a position as to permit the suspended article to pass through the station. After the wire hook 52 passes the tip end of the rod 88 the latter will yieldably swing back into the full line position of FIG. 1 awaiting the arrival of the next transporter 14. In the event the next transporter 14 has an article suspended from the finger which will rotate into unloading position in such unloading station 16, the wire hook 52 will be carried over the rod 88 and at that moment the finger will be rotated so as to drop the wire hook upon the rod 88 from which it will slide by gravity on to the rod 80.

In the unloading station identified by reference numeral 18 there is provided an inclined rod 106 supported by bracket 108 which in turn is secured to a fixed portion of the station 18. The rod 106 is inclined downwardly and the outer end thereof is supported by a pedestal or the like 110. The upper end of the rod 106 terminates in such position as to lie beneath the set of fingers on any transporter 14 which passes therethrough and yet is spaced from the body of the transporter so that wire hooks 52 of the garment hangers will clear the same. However, when a garment hanger is carried by the finger which will be turned into unloading position in station number 18, the finger will rotate downwardly overlapping the end of the rod 106 whereby the garment hanger will slide off the finger and on to the rod 106 for gravitation into the station as desired.

When a conveyor embodying the present invention is erected to meet the particular requirements of the purchaser any one or more of the unloading stations may be set up, like station 16, for unloading rearwardly of the conveyor path as viewed in FIGS. 1 and 2 and any one or more of the stations may be set up, like station 18, for unloading forwardly of the conveyor path. The particular construction of the take-away means provided by the present invention is such that no alteration of the basic structure of the unloading stations is required for conversion to unloading in either of the directions lateral of the conveyor path. Those stations, like station 16, which are to unload rearwardly require the attachment thereto of the lever 88 and its mounting means whereas these parts are omitted from stations, like station 18, which are to unload forwardly. The stationary parts, such as the rod 80 for station 16 or the rod 106 for station 18 are attached as required. Any subsequent alterations in unloading direction of a station may be made quickly and inexpensively by removal or attachment of a lever 88 and a rod 80 or 106 as may be required.

What is claimed is:

1. On a conveyor having a plurality of movable transporters for carrying articles along a predetermined path, each of said transporters having at least one article holding device, a plurality of unloading stations located along said predetermined path, each of said unloading stations and each of said transporters having selectively interengageable means effective in at least one predetermined unloading station to move said article holding device from an article holding position to a position wherein an article held by said device is released for gravitational movement which is initiated in one predetermined direction laterally away from said predetermined path, and take-away means associated with each of said unloading stations for receiving articles unloaded from the associated station and for conducting said unloaded articles out of said predetermined path, the improvement wherein the take-away means associated with at least one of said unloading stations comprises a rod, means supporting one end of said rod for swinging movement about an axis spaced from said predetermined path laterally in the direction in which unloading movement of an article is initiated, means yieldably urging said rod into a first position sloping downwardly in said opposite direction, said rod in said first position having a portion extending substantially transversely across said predetermined path and terminating in a free end located at a point spaced from said path laterally in said opposite direction, said rod in said first position being so positioned lengthwise of said predetermined path as to catch any article unloaded from said associated station and to conduct said unloaded article across said predetermined path to the free end of said rod, means mounted adjacent the free end of said rod in said first position for receiving article from said free end, and said portion of said rod when in said first position being engageable by articles retained and carried through said associated station by said transporters whereby continued movement of each engaged article is effective to swing said rod about said axis and against said yieldable means temporarily into a second position to permit each engaged article to pass beyond the free end of said rod.

2. In a conveyor as defined in claim 1 the further improvement wherein said means yieldably urging said rod toward said first position comprises an outer bearing member establishing said axis along a line which is inclined from the vertical and lies in a plane extending substantially transversely of said predetermined path, and said rod has fixed thereto substantially at a right angle an inner bearing member rotatable about said axis whereby the weight of said rod yieldably urges said rod toward said first position.

3. In a conveyor as defined in claim 1 the further improvement wherein said means yieldably urging said rod toward said first position comprises a spring.

4. In a conveyor as defined in claim 2 the further improvement which comprises a spring which additionally urges said rod toward said first position.

5. In a conveyor as defined in claim 1 the further improvement wherein the take-away means associated with at least one other of said unloading stations comprises a guide rod having a free end terminating at a point spaced from said predetermined path laterally in the direction in which article unloading movement is initiated, means mounting said guide rod in a fixed position inclined downwardly and away from said predetermined path in said direction and with said free end positioned to catch articles unloaded from said other station.

References Cited by the Examiner

UNITED STATES PATENTS 3,124,236  3/1964  Gerisch _____ 198—169

EVON C. BLUNK, *Primary Examiner.*

R. E. AEGERTER, *Assistant Examiner.*